United States Patent
Khan et al.

(10) Patent No.: US 9,563,990 B2
(45) Date of Patent: Feb. 7, 2017

(54) VEHICLE ACCESS SYSTEM

(71) Applicant: Jaguar Land Rover Limited, Coventry (GB)

(72) Inventors: Mohammed Khan, Coventry (GB); Howard Siswick, Coventry (GB)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 14/355,652

(22) PCT Filed: Nov. 16, 2012

(86) PCT No.: PCT/EP2012/072895
§ 371 (c)(1),
(2) Date: May 1, 2014

(87) PCT Pub. No.: WO2013/072489
PCT Pub. Date: May 23, 2013

(65) Prior Publication Data
US 2014/0285319 A1     Sep. 25, 2014

(30) Foreign Application Priority Data
Nov. 16, 2011 (GB) .................................. 1119792.8

(51) Int. Cl.
G05B 19/00 (2006.01)
G07C 9/00 (2006.01)
B60R 25/00 (2013.01)

(52) U.S. Cl.
CPC ................. *G07C 9/00* (2013.01); *B60R 25/00* (2013.01); *G07C 9/00309* (2013.01); *G07C 2209/08* (2013.01); *G07C 2209/63* (2013.01)

(58) Field of Classification Search
CPC ... G07C 2209/08; G07C 9/00; G07C 2209/63; G07C 9/00309; G07C 2009/0039; G07C 2009/0096; G07C 2009/00357; B60R 25/00; B60R 25/245; B60R 25/24; G01S 2013/466
(Continued)

(56) References Cited

U.S. PATENT DOCUMENTS 6,034,617 A * 3/2000 Luebke .............. G07C 9/00309
307/10.2
2004/0075532 A1 4/2004 Ueda et al.
(Continued)

FOREIGN PATENT DOCUMENTS

CN         103217662 A      7/2013
DE      102004054134 A1     5/2006
(Continued)

OTHER PUBLICATIONS

U.S. Appl. No. 61/566,339, filed Dec. 2, 2011.
(Continued)

*Primary Examiner* — Mirza Alam
(74) *Attorney, Agent, or Firm* — Myers Bigel, P.A.

(57) ABSTRACT

The invention relates to an access unit (5; 23) for communicating with a further access unit (5; 23) to control access to a vehicle (3). The access unit (5; 23) comprises at least a first transmitter (11; 25) for transmitting a polling signal; and at least a first receiver (11; 25) for receiving an authentication signal from the further access unit (5; 23) in response to the polling signal. At least the first transmitter (11; 25) is a first ultra-wideband transmitter and at least the first receiver (11; 25) is a first ultra-wide-band receiver. The invention also relates to a vehicle access system (1) which is a combination of the access and further access units (5; 23). The invention also relates to methods of operating a vehicle access system (1) and a vehicle access unit (5; 23).

11 Claims, 6 Drawing Sheets

(58) Field of Classification Search
USPC .......... 340/5.61, 5.63, 522, 539, 573.1, 426, 340/426.35; 455/456.1; 307/10.2
See application file for complete search history.

(56) References Cited

U.S. PATENT DOCUMENTS

| | | | |
|---|---|---|---|
| 2007/0288995 A1 | 12/2007 | Terada et al. | |
| 2008/0048846 A1 | 2/2008 | Nagai et al. | |
| 2009/0284345 A1 | 11/2009 | Ghabra et al. | |
| 2010/0076622 A1 | 3/2010 | Dickerhoof et al. | |
| 2010/0308961 A1* | 12/2010 | Ghabra | B60R 25/00 340/5.61 |
| 2010/0321154 A1* | 12/2010 | Ghabra | B60R 25/00 340/5.61 |
| 2011/0109447 A1* | 5/2011 | Saguchi | B60R 25/10 340/426.35 |
| 2011/0148573 A1 | 6/2011 | Ghabra et al. | |
| 2013/0069760 A1* | 3/2013 | Lickfelt | H04B 17/29 340/5.61 |
| 2013/0143594 A1* | 6/2013 | Ghabra | H04W 24/00 455/456.1 |

FOREIGN PATENT DOCUMENTS

| | | |
|---|---|---|
| DE | 102012222083 A1 | 6/2013 |
| EP | 0 570 761 A1 | 5/1993 |
| EP | 1 099 812 A2 | 5/2001 |
| EP | 1 254 814 A2 | 11/2002 |
| EP | 1 443 471 A2 | 8/2004 |
| EP | 1 735 755 A1 | 11/2005 |
| EP | 1995402 A1 | 11/2008 |
| GB | 2498837 A | 7/2013 |
| JP | H09170364 A | 6/1997 |
| JP | 2005330651 A | 12/2005 |
| JP | 2005344335 A | 12/2005 |
| JP | 2006348504 A | 12/2006 |
| WO | WO 2005/024734 A1 | 3/2005 |
| WO | WO 2007/073969 A1 | 7/2007 |

OTHER PUBLICATIONS

"An Introduction to Automotive Keyless Entry Systems, Automotive Keyless Entry schemes and their implementation with DecaWave's ScenSor technology," Version 1.00, DecaWave, 2010, 12 pages.
Combined Search and Examination Report, Application No. GB1220633.0, Mar. 5, 2013, 8 pages.
International Search Report, International Application No. PCT/EP2012/072895, Jan. 30, 2013, 12 pages.
Notice of Reasons for Refusal, Japanese Patent Application No. 2014-541687, Aug. 2, 2016, 7 pages.

* cited by examiner

VEHICLE ACCESS SYSTEM

RELATED APPLICATIONS

This application is a 35 U.S.C. §371 national stage application of PCT Application No. PCT/EP2012/072895, filed on Nov. 16, 2012, which claims priority from Great Britain Patent Application No. 1119792.8, filed Nov. 16, 2011, the contents of which are incorporated herein by reference in their entireties. The above-referenced PCT International Application was published in the English language as International Publication No. WO 2013/072489 A1 on May 23, 2013.

TECHNICAL FIELD

The present invention relates to a vehicle access system for providing passive access to a vehicle. The vehicle access system has particular application for motor vehicles. Aspects of the invention relate to an access unit, to a system, to a method and to a vehicle.

BACKGROUND OF THE INVENTION

It is known to provide passive entry and passive starting (PEPS) systems for motor vehicles. The vehicle user typically carries a key fob which can communicate with a base station in the vehicle. The key fob remains in a very low power state to conserve its internal battery. Upon receipt of an initiating trigger (for example when a vehicle door handle is operated), the base station emits a powerful Low Frequency (LF) electromagnetic field, the energy from which wakes up the key fob using a charge pump technique. Once awake, the key fob can then respond to a challenge using Radio Frequencies (RF). The key fob sends a response signal which is validated by the base station to authenticate the key fob. If the key fob is authenticated, the base station actuates a door lock to unlock the door.

The energy required from the vehicle to generate the LF field is considerable, which is why a trigger is universally employed to begin the process. Moreover, the consequence of using an initiating trigger is that the whole sequence of validating the key fob's identity and unlocking the vehicle has to be extremely short to avoid a customer experiencing a delay in the vehicle's response. To help avoid any such delay, a fast-release motor can be provided to unlock the door to provide seamless operation as if the vehicle was already unlocked.

The present invention attempts to address or ameliorate at least some of the above problems associated with known vehicle access systems.

SUMMARY OF THE INVENTION

In one aspect, the present invention provides an access unit for communicating with a further access unit to control access to a vehicle, the access unit comprising:
  at least a first transmitter for transmitting a polling signal; and
  at least a first receiver for receiving an authentication signal from the further access unit in response to said polling signal;
  wherein at least the first transmitter is a first ultra-wideband transmitter and at least the first receiver is a first ultra-wideband receiver.

The use of an ultra-wideband transmitter for transmitting the polling signal is advantageous in that the power required to generate the polling signal is very low. Because of the low power demand, it is possible for the polling signal to be used to initiate communication between the access unit and the further access unit. In this way, it is not necessary for there to be an initial trigger, such as the user operating the door handle. Rather, communication can be initiated wirelessly. Thus, any delay experienced by the user in opening the vehicle door can be eliminated without the need to incur the additional cost of a fast-release motor in the door. Furthermore, because the polling signal is transmitted over such a wide bandwidth, it is resistant to multi-path fading which adversely affects conventional narrow band schemes in 'crowded' RF environments. This enables the use of the polling signal to reliably initiate communication between the access unit and the further access unit in situations where there are lots of reflections.

At least the first transmitter may be configured operatively to transmit the polling signal continually during an operating period to initiate communication between the access unit and the further access unit.

At least the first transmitter may be configured to pulse the polling signal with a time interval between transmissions. Alternatively, at least the first transmitter may be configured to transmit the polling signal continuously such that there is no time interval between transmissions. In either case, at least the first transmitter can be said to be activated for the duration of the operating period to transmit the polling signal, i.e. whether the polling signal is continuously transmitted or continually transmitted with a time interval between transmissions, whereas, outside of the operating period, at least the first transmitter may be deactivated.

At least the first transmitter may be configured, in use, to modify the length of the time interval between transmissions of the polling signal in response to parameters determined from the communication between the access unit and the further access unit.

At least the first transmitter may be configured: to increase the time interval between transmissions of the polling signal in response to an increase in the distance between the access unit and the further access unit; and/or to reduce the time interval between transmissions of the polling signal in response to a reduction in the distance between the access unit and the further access unit.

At least the first transmitter may be configured to modify the length of the time interval between transmissions of the polling signal in dependence on the distance between access unit and the further access unit, wherein said distance is determined based on the time of flight of communications between the access unit and the further access unit. It is a particular advantage of ultra-wide communications that it is possible to distinguish between signals which travel along a direct path between transmitter and receiver and those which follow non-direct paths. Accordingly, this allows the distance between the access unit and the further access unit to be established with a high degree of accuracy, much more so than distance measurements in conventional narrow-band systems which typically rely on radio signal strength intensity (RSSI) measurements.

The access unit may be a portable unit for communicating with a further access unit installed in a vehicle.

At least the first transmitter may stop transmitting the polling signal if the access unit is stationary for a predetermined period of time. In other words, the operating period, during which the first transmitter is activated and transmission of the polling signal occurs, may be terminated if the access unit remains stationary for a predetermined period of time.

The access unit may comprise a motion sensor for outputting an activation signal to start at least the first transmitter transmitting the polling signal when the access unit is moved. Thus, when at least the first transmitter is activated by the activation signal, a new operating period starts and transmission of the polling signal commences.

In another aspect, the present invention provides a vehicle access system comprising an access unit as described above in combination with a further access unit, wherein the further access unit comprises:
- at least a second receiver for receiving the polling signal from the access unit; and
- at least a second transmitter for transmitting an authentication signal;
- wherein at least the second transmitter is operatively configured to transmit the authentication signal in response to the polling signal received from the access unit; and
- wherein at least the second transmitter is a second ultra-wideband transmitter and at least the second receiver is a second ultra-wideband receiver.

The further access unit may comprise a controller for authenticating a response signal transmitted from the access unit in response to said authentication signal.

The controller may be configured to initiate unlocking of at least one vehicle door when the distance between the access unit and the further access unit is less than or equal to a threshold range; and/or the controller may be configured to initiate locking of at least one vehicle door when the distance between the first access unit and the further access unit is greater than or equal to a threshold range.

The controller may be configured to determine a distance between the access unit and the further access unit; and/or the controller may be configured to determine a direction of the access unit in relation to the further access unit; and/or the controller is configured to initiate the unlocking of at least one vehicle door on the side of the vehicle proximal the access unit.

The distance between the access unit and the further access unit may be determined based on the time of flight of communications between the access unit and the further access unit.

The controller may be configured to generate an alert signal if a vehicle door is partially or completely open; and/or the controller may be configured to generate a shut-down signal to disable the access unit.

In a further aspect, the present invention provides a method of operating a vehicle access system, the method comprising:
- transmitting a polling signal from an access unit; and
- transmitting an authentication signal from a further access unit upon receipt of said polling signal;
- wherein the polling signal and the authentication signal are ultra-wideband signals.

The polling signal may be transmitted continually during an operating period and contact between the access unit and the further access unit may be initiated upon receipt of the polling signal by said further access unit.

Optionally, at least one vehicle door is unlocked when the distance between the access unit and the further access unit is less than or equal to a threshold range; and/or at least one vehicle door is locked when the distance between the access unit and the further access unit is greater than or equal to a threshold range.

The method may comprise determining the distance between the access unit and the further access unit based on the time of flight of communications between the access unit and the further access unit.

In still another aspect, the present invention provides a method of operating an access unit for controlling access to a vehicle, the method comprising: transmitting a polling signal continually to initiate communication between the access unit and a further access unit, wherein the polling signal is an ultra-wideband signal.

The polling signal may be pulsed and a time interval is introduced between pulses, and the time interval may be modified in response to changes in a measured parameter relating to said access unit and/or said further access unit. The length of the time interval may be modified in dependence on the distance between the access unit and the further access unit, the method comprising determining the distance between the access unit and the further access unit based on the time of flight of communications between the access unit and the further access unit.

In a further aspect, the present invention provides a vehicle having an access unit or a system, or adapted to perform a method as described above.

According to one aspect of the present invention there is provided a first access unit for communicating with a second access unit to control access to a vehicle, the first access unit comprising at least a first transmitter for transmitting a polling signal and at least a first receiver for receiving an authentication signal from the second access unit in response to said polling signal, wherein at least the first transmitter is configured operatively to transmit the polling signal continually to initiate communication between the first access unit and the second access unit.

By transmitting the polling signal continually, the first access unit can establish communication with the second access unit to facilitate automated operation. In prior art systems, an initiating trigger, for example issued when a door handle is operated, is required to activate the system. The arrangement of the present invention whereby the polling signal is transmitted continually allows passive operation without an initiating trigger.

At least the first transmitter is configured to transmit the polling signal continually. When the second access unit receives the polling signal, an interrogation cycle can be initiated automatically. In response to the polling signal, the second access unit can transmit an authentication signal. The authentication can, for example, be a challenge signal to prompt transmission of a response signal from the first access unit. If the second access unit receives an appropriate response signal, the first access unit is authorized to control access to the vehicle. The interrogation cycle between the first and second access units is passive and does not require user input.

The polling signal could be continuous. However, to conserve power, the polling signal can be pulsed with a time interval between transmissions. The time interval between transmissions of the polling signal can be greater than or equal to: 0.5 seconds, 1 second, 2 seconds, 3 seconds, 5 seconds or 10 seconds. An increased time interval can help to conserve power.

Furthermore, at least the first transmitter can be configured to adjust the time interval between transmissions of the polling signal in response to measured parameters. For example, the time interval between repetitions of the polling signal can be increased as the distance between the first access unit and the second access unit increases. Conversely, the time interval between transmissions of the polling signal can be reduced as the distance between the first access unit and the second access unit decreases. Alternatively, the time interval between transmissions of the polling signal can be adjusted depending on the speed with which the first access unit and the second access unit travel towards or away from each other.

At least the first transmitter could, for example, access a look-up table comprising a set of threshold values for selecting the time interval between transmissions of the polling signal. The look-up table can specify the time interval between transmissions based on the measured distance between the first access unit and the second access unit. The look-up table can specify the time interval between transmissions based on the speed at which the second access unit is travelling towards or away from the vehicle. The look-up table can be stored in memory, such as Read Only Memory (ROM).

To conserve power, the polling signal can be transmitted continually during a predetermined time period. The time period can be greater than or equal to: 6 hours, 12 hours, 24 hours, 5 days, 10 days, 15 days or 30 days. The time period may be shortened if the first access unit determines that a battery power level has dropped below an operating threshold.

The first access unit can comprise a plurality of said first transmitters and/or a plurality of said first receivers. An antenna is connected to at least the first transmitter and/or at least the first receiver.

The first access unit could be provided in a base unit in the vehicle and the second access unit could be a portable, such as a key fob. Alternatively, the first access unit can be portable, for example a key fob, to be carried on the person of a user. The second access unit can be provided in the vehicle, for example in a base unit.

According to another aspect of the present invention there is provided a vehicle access system comprising a first access unit as described herein in combination with a second access unit. The second access unit can comprise: at least a second receiver for receiving the polling signal from the first access unit; and at least a second transmitter for transmitting an authentication signal. At least the second transmitter can be operatively configured to transmit the authentication signal in response to the polling signal received from the first access unit.

The second access unit can comprise a plurality of said second transmitters and/or a plurality of said second receivers. An antenna is connected to at least the second transmitter and/or at least the second receiver.

The second access unit can comprise a controller for authenticating a response signal transmitted from the first access unit in response to said authentication signal. The second controller can, for example, comprise an electronic control unit.

The controller can be configured to determine a distance between the first access unit and the second access unit. The time of flight (ToF) of a transmission between the first access unit and the second access unit can be used to determine the distance between the first access unit and the second access unit. The distance can be determined by measuring the time taken between transmitting an authentication signal and receiving a signal from the first access unit. There are various algorithms in the art for performing suitable ranging measurements.

The controller can be configured to determine a direction of the first access unit in relation to the second access unit. The time of flight (ToF) of a transmission between the first access unit and the second access unit can be used to determine a direction of the first access unit in relation to the second access unit. The direction can, for example, be determined by measuring the distance between at least the first transmitter/receiver in the first access unit and at least the second transmitter/receiver in the second access unit. A triangulation algorithm can then be employed to calculate the position of the first and second access units in relation to each other.

The second access unit can be configured to track the position of the first access unit. The second access unit can perform vector analysis to measure both the speed and direction of travel of the first access unit.

The controller can be configured to initiate locking and/or unlocking of at least one vehicle door. The controller can initiate unlocking of one or more vehicle doors when the distance between the first access unit and the second access unit is less than or equal to a threshold range. The controller can be configured to initiate locking of at least one vehicle door when the distance between the first access unit and the second access unit is greater than or equal to a threshold range.

The controller could be configured to unlock said at least one vehicle door only when the first access unit is moving towards the second access unit. The controller could be configured to lock said at least one vehicle door only when the first access unit is moving away from the second access unit.

The controller can be configured to initiate the unlocking of at least one vehicle door on the side of the vehicle proximal the first access unit. For example, the controller could be configured to unlock only the vehicle door closest to the first access unit. By determining the position of the first access unit in relation to the second access unit (as described herein), the controller can determine whether the first access unit is on the right hand side or the left hand side of the vehicle. The door(s) on that side of the vehicle can then be opened.

The controller can be configured to generate an alert signal if a vehicle door is partially or completely open. The controller can, for example, determine if a door is ajar and cannot be locked. The alert signal can provide a mis-lock notification.

The controller can provide single point entry or multiple point entry to the vehicle. In multiple point entry, all of the vehicle's doors are unlocked, for example when a user operates the door handle on a door which has been unlocked by the controller. In single point entry, the vehicle doors are locked when the first access unit is detected inside the vehicle and the doors are all closed.

The controller can be operable to disable the first access unit. For example, a shut-down signal can be transmitted by the second transmitter to disable the first access unit. A shut-down signal could, for example, be transmitted if the controller determines that the first access unit is stationary for a predetermined period or time; and/or in a particular location (for example inside the vehicle or in the glove box of the vehicle). The shut-down signal can provide an instruction to the first access unit to stop transmitting the polling signal. The first access unit could be re-activated by pressing a button. Alternatively, the first access unit may comprise a motion sensor, such as an accelerometer or a gyroscope, which outputs an activation signal when the first access unit is moved. The provision of a motion sensor for controlling the first access unit is believed to be patentable independently.

The second access unit can be configured to transmit a status signal to provide vehicle status information. For example, the status signal can provide a notification that: (i) all doors have been locked; (ii) one or more doors are open or ajar; or (iii) one or more doors cannot be locked. The first access unit can comprise display means for notifying a user of the vehicle status. For example, one or more Light Emitting Diodes (LEDs); or a display could be provided on the first access unit.

The first access unit can comprise a rechargeable battery for operating the first transmitter and the first receiver. The first access unit can be docked in the vehicle to recharge the battery. The first access unit can comprise a processor for controlling the first transmitter and/or the first receiver. The processor can be configured to calculate a distance between the first access unit and the second access unit. The interval between transmission cycles for the polling signal can be set by said processor.

At least the first transmitter and at least the first receiver can be combined as at least a first transceiver. Each first transceiver can have a first antenna. Likewise, at least the second transmitter and at least the second receiver can be combined as at least a second transceiver. Each second transceiver can each have a second antenna.

The apparatus and processes described herein could be implemented using RF frequencies. However, the inventors have recognised that ultra-wideband technology is suitable for implementing the present invention whereby the polling signal is transmitted continually. The use of ultra-wideband transmitters and receivers allows time of flight (ToF) to be determined for communications between the first access unit and the second access unit. The time of flight can be employed to determine the distance between the first access unit and the second access unit; and/or the direction of the first access unit in relation to the second access unit. At least the first transmitter can be a first ultra-wideband transmitter and at least the first receiver can be a first ultra-wideband receiver. At least the second transmitter can be a second ultra-wideband transmitter and at least the second receiver can be a second ultra-wideband receiver.

Ultra-wideband (UWB) technology typically has an operating frequency of between 3.1 GHz and 10.6 GHz and can enable high bandwidth communications with low power consumption. A suitable operating protocol is provided under IEEE 802.15.4a. Furthermore, the sub-set of UWB frequencies designated as Band Group 6 (consisting of Bands #9, #10 and #11, ranging from 7392 MHz to 8976 MHz) can be used.

According to a further aspect of the present invention there is provided a vehicle access unit for installation in a vehicle, wherein the vehicle access unit comprises: at least one receiver for receiving a signal from a remote access unit; at least one transmitter for transmitting an authentication signal to said remote access unit; and a controller. The controller can be configured to initiate unlocking of at least one vehicle door when the distance between the vehicle and the remote access unit is less than or equal to a threshold range. The controller can be configured to initiate locking of at least one vehicle door when the distance between the vehicle and the remote access unit is greater than or equal to a threshold range. Alternatively, or in addition, the controller can be configured to determine a direction of the remote access unit in relation to the vehicle. The controller can be configured to initiate the unlocking of at least one vehicle door on the side of the vehicle proximal the remote access unit.

According to a still further aspect of the present invention there is provided a method of operating a first access unit for controlling access to a vehicle, the method comprising: transmitting a polling signal continually to initiate communication between the first access unit and the second access unit. The first access unit can be installed in the vehicle or can be portable.

The polling signal can be pulsed and a time interval can be provided between pulses. The time interval can be varied between pulses in response to measured parameters, such as the distance between the first access unit and the second access unit. The present invention also relates to a computer program for installation on a control unit, the computer program being executable to cause the control unit to operate in accordance with the method described herein.

According to another aspect of the present invention there is provided a method of operating a vehicle access system, the method comprising transmitting a polling signal from a first access unit and transmitting an authentication signal from a second access unit upon receipt of said polling signal, wherein the polling signal is transmitted continually and contact between the first access unit and the second access unit is initiated upon receipt of the polling signal by said second access unit.

The first access unit could be installed in a vehicle and the second access unit could be portable. Alternatively, the first access unit can be portable and the second access unit can be installed in a vehicle.

The method can comprise tracking the position of the first access unit in relation to the second access unit.

At least one ultra-wideband transmitter can be used to transmit the polling signal and/or the authentication signal. The polling signal and/or the authentication signal can be received by at least one ultra-wideband receiver.

The polling signal could be continuous or it could be pulsed. A time interval can be provided between pulses of the polling signal. The time interval can be modified in response to changes in a measured parameter relating to said first access unit and/or said second access unit. For example, the method can comprise increasing the time interval between transmissions of the polling signal as the distance between the first access unit and the second access unit increases. Conversely, the method can comprise reducing the time interval between transmissions of the polling signal as the distance between the first access unit and the second access unit decreases.

The method can comprise unlocking at least one vehicle door when the distance between the first access unit and the second access unit is less than or equal to a threshold range. The threshold range can define an authorization zone which extends at least partially around the vehicle.

The method can comprise determining the position of the first access unit in relation to the second access unit and optionally unlocking at least one door on the appropriate side of the vehicle.

The method can comprise locking at least one vehicle door when the distance between the first access unit and the second access unit is greater than or equal to a threshold range.

The method can also comprise transmitting a shut-down signal to disable the first access unit if it is determined that the first access unit is dormant. The first access unit may be considered to be dormant if it is not moved for a predetermined period of time; and/or is in a particular location (for example it is inside the vehicle or in a glove box in the vehicle).

The first access unit can be a key fob or other portable device which can be carried on the person of a user. The second access unit can be a base station in a vehicle. The second access unit can be connected to vehicle systems over a communication bus.

According to yet another aspect of the present invention there is provided a first access unit for communicating with a second access unit to control access to a vehicle, the first access unit being portable and comprising: at least a first transmitter for transmitting a polling signal; and at least a first receiver for receiving an authentication signal from the second access unit; wherein the first access unit is configured to disable at least the first receiver and/or at least the first transmitter if the first access unit remains substantially stationary for a predetermined period of time. The first access unit can be an electronic key, for example in the form of a key fob. By selectively deactivating at least the first receiver and/or at least the first transmitter, unnecessary dialogue between the first and second access units can be avoided to preserve the battery.

The position of the first access unit can be tracked by the second access unit. The second access unit can transmit a deactivation signal to the first access unit if it determines that the first access unit has been substantially stationary for said predetermined period of time. The deactivation signal could be specific to a particular first access unit, for example if more than one first access unit is in use. The first access unit can be configured to stop transmitting the polling signal upon receipt of said deactivation signal.

The first access unit can further comprise a motion detector, such as an accelerometer or a gyroscope, for detecting movement of the first access unit. When the first access unit is moved, the motion detector can transmit an activation signal to instruct at least the first transmitter to start transmitting the polling signal. It will be appreciated that the motion sensor could be configured to transmit the deactivation signal if it determined that the first access unit had been substantially stationary for a predetermined period of time.

The method described herein can be implemented on a computational device comprising one or more processors, such as an electronic microprocessor. The processor(s) can be configured to perform computational instructions stored in memory or in a storage device. The electronic control unit described herein can comprise one or more processors configured to perform computational instructions.

Within the scope of this application it is envisaged that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

An embodiment of the present invention will now be described, by way of example only, with reference to the accompanying figures, in which.

DETAILED DESCRIPTION OF AN EMBODIMENT

Figure 1:
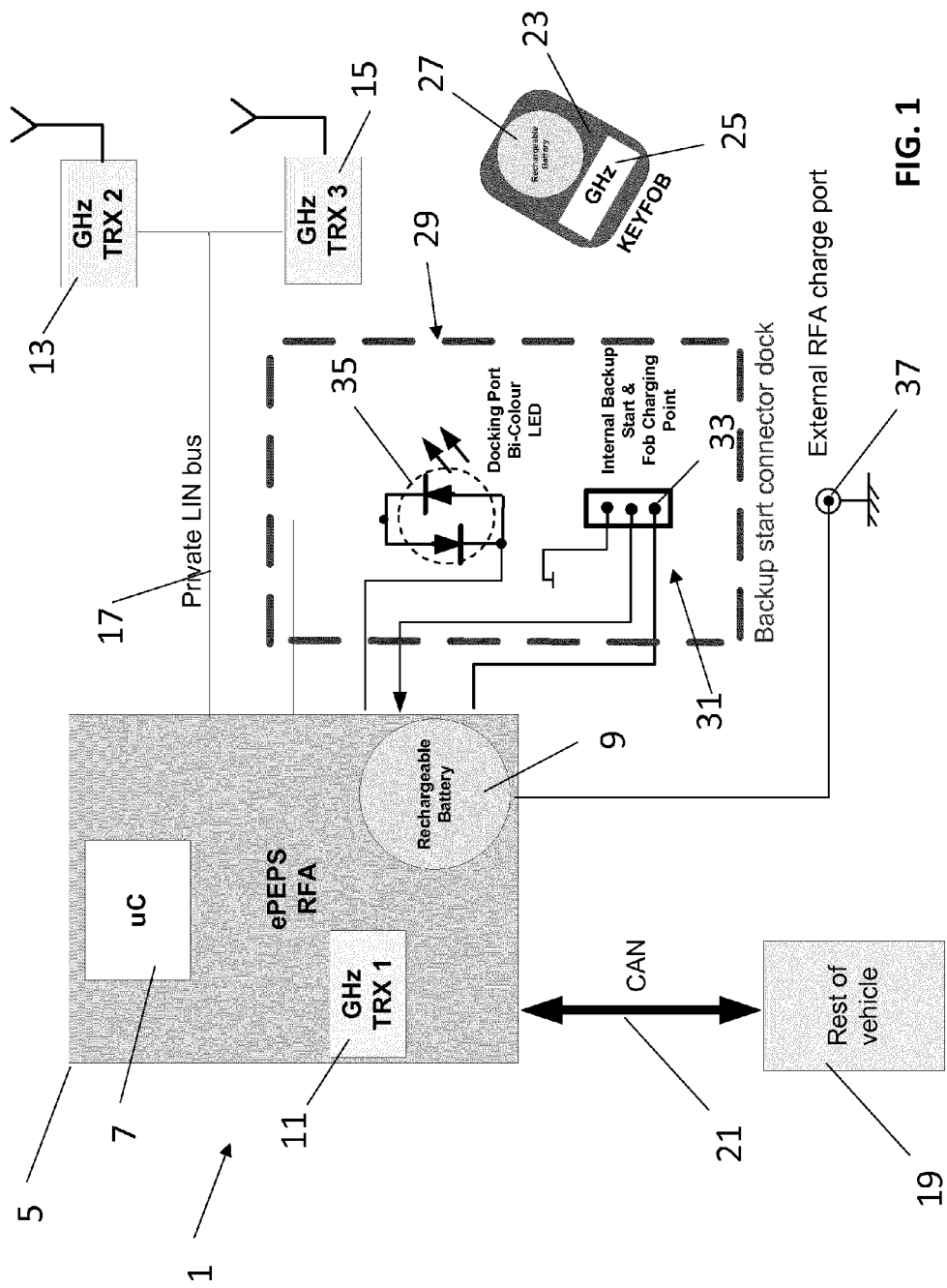
FIG. 1 shows a schematic representation of a vehicle access system according to an embodiment of the present invention.

An access system 1 in accordance with an embodiment of the present invention is shown in FIG. 1. The vehicle access system 1 is configured to provide enhanced Passive Entry and Passive Start (ePEPS) of a vehicle 3. In particular, the vehicle access system 1 supports keyless access and, optionally, remote engine start.

The vehicle access system 1 will be described with reference to the vehicle 3 which has a front right door D1, a rear right door D2, a front left door D3 and a rear left door D4. The vehicle 3 also has a boot lid D5 (also known as a deck lid) which can be locked/unlocked by the vehicle access system 1 but this is not described herein for the sake of brevity. The doors D1-D4 each have a lock mechanism and an external handle; and the front doors D1, D3 each have a folding door mirror. The lock mechanisms each comprise a door lock switch to provide a locking signal to indicate the status of the respective lock mechanism.

The vehicle access system 1 comprises a base station 5 to be installed in the vehicle 3 to provide a Remote Function Actuator (RFA) for the vehicle 3. The base station 5 comprises an electronic control unit 7 and a first rechargeable battery 9. The first rechargeable battery 9 provides a dedicated power supply for the base station 5 to enable independent operation. The base station 5 further comprises first, second and third ultra-wideband transceivers 11, 13, 15. The first transceiver 11 is provided proximal the electronic control unit 7. The second and third transceivers 13, 15 are positioned in the vehicle 3 remote from the electronic control unit 7 and connected via a dedicated local interconnect network (LIN) 17. The transceivers 11, 13, 15 each have an integrated antenna.

The base station 5 is connected to the vehicle systems (denoted generally by the reference numeral 19) via a CAN bus 21. The base station 5 can thereby receive the locking signals from the door lock switches; and control operation of the door lock mechanisms. The CAN bus 21 can also be employed to convey instructions from the electronic control unit 7 to the engine control unit to enable/disable passive engine starts.

The vehicle access system 1 further comprises a key fob 23 having a remote ultra-wideband transceiver 25 and a second rechargeable battery 27. The key fob 23 is portable and is typically carried by the user. As described herein, the key fob 23 communicates with the base station 5 to enable passive entry to the vehicle.

The base station 5 further comprises a connector dock 29 for receiving the key fob 23. The connector dock 29 has a port 31 to enable communication between the base station 5 and the key fob 23. A charging connection 33 is also provided in the connector dock 29 to charge the second rechargeable battery 27 when the key fob 23 is docked. A bi-colour light emitting diode 35 is provided in the connector dock 29 to indicate the status of the key fob 23 (for example to indicate that the second rechargeable battery 27 is charging or is fully charged). The charging connection 33 is connected to a power supply unit (PSU) provided in the base station 5. An external charge port 37 for the base unit 35 is provided for charging the first battery 9.

Figure 2:
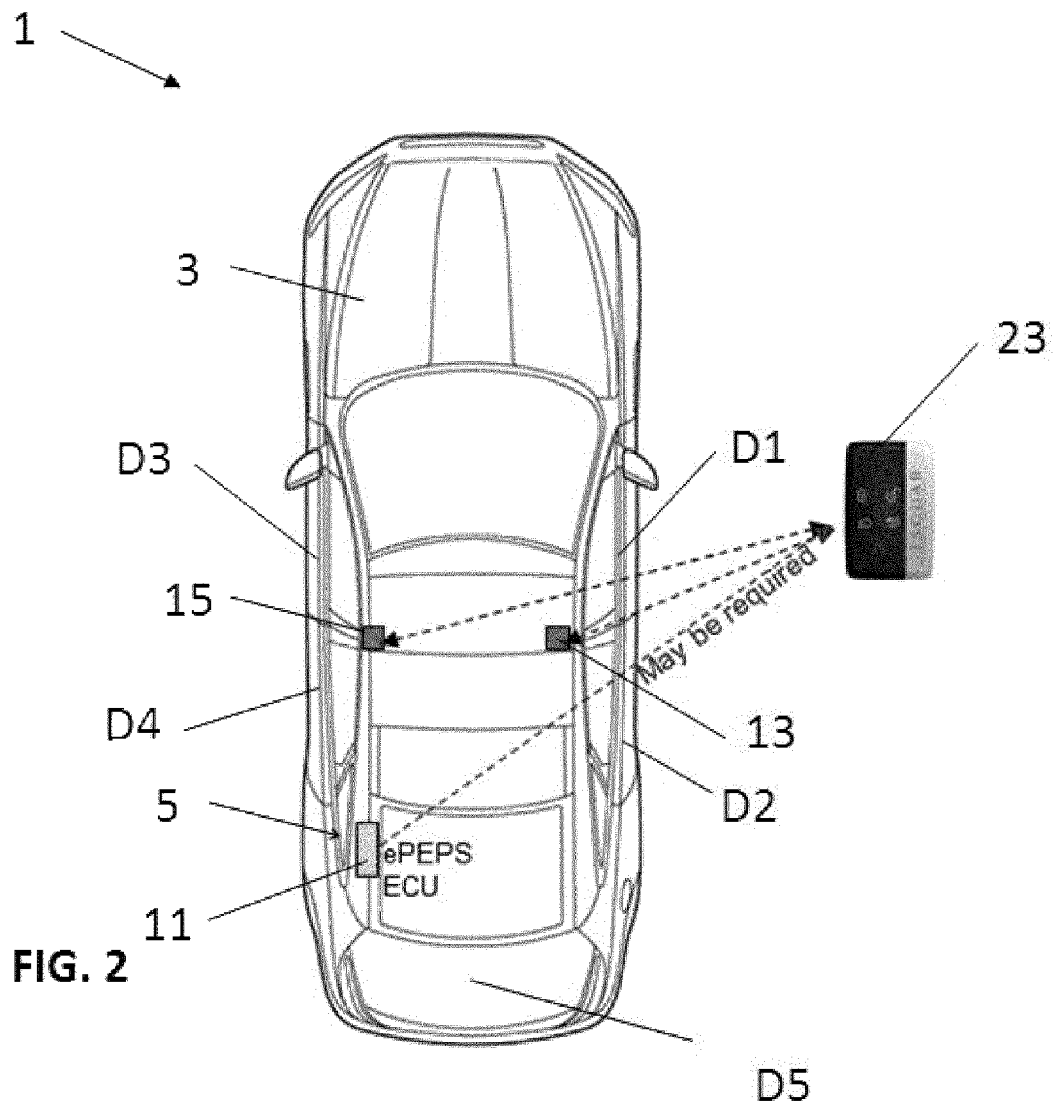
FIG. 2 shows the installation of the base station and transceivers of the vehicle access system in a motor vehicle.

The installation of the vehicle access system 1 is illustrated in FIG. 2. The base station 5 and the first transceiver 11 are located at the rear of the vehicle 3 and the second and third transceivers 13, 15 are located in the upper part of the vehicle (typically in the roof) on the right and left sides respectively of the vehicle 3. As illustrated by dashed lines in FIG. 2, the transceivers 11, 13, 15 communicate with the key fob 23. The distance from each of the first, second and third transceivers 11, 13, 15 to the remote transceiver 25 can be determined by measuring transmission and/or response time (for example, time of flight for a signal transmission) thereby allowing the position of the key fob 23 in relation to the vehicle 3 to be determined through triangulation. The use of ultra-wideband frequencies (typically greater than 3 GHz) allows the position of the key fob 23 to be tracked with a relatively high degree of accuracy.

The remote transceiver 25 transmits a polling signal which, when received by the first transceiver 11, initiates communication between the base station 5 and the key fob 23. Upon receipt of the polling signal, the first transceiver 11 responds by transmitting a challenge signal. The challenge signal is received by the key fob 23 and prompts the transmission of a response signal. The electronic control unit 7 validates the response signal.

If the response signal is authenticated, the electronic control unit 7 continues to communicate with the key fob 23 and tracks its position in relation to the vehicle 3. Moreover, provided the challenge/response sequence is completed successfully, the electronic control unit 7 will provide access to the vehicle 3 subject to operating criteria being satisfied. If the response signal is not authenticated, the electronic control unit 7 will not unlock the vehicle 3.

The polling signal is transmitted continually by the remote transceiver 25 so that communication with the base station 5 is initiated by the key fob 23. Accordingly, the vehicle access system 1 can initiate a challenge/response cycle without the need for user interaction, such as actuating a door handle.

To conserve the second battery 27, the polling signal is transmitted for an operating period of thirty (30) days. The transmission of the polling signal is stopped if the key fob 23 does not establish communication with the base station 5 during the operating period. A button provided on the key fob 23 can be pressed to re-commence transmission of the polling signal after said operating period has expired.

In the presently described embodiment, the polling signal is not transmitted continuously. Rather, the polling signal is repeated during the operating period with a time interval between transmission cycles (pulses), i.e. the polling signal is transmitted continually during the operating period. The time interval between the transmission cycles can be modified in response to measured parameters. For example, the time interval between transmissions can be modified depending on the measured distance between the vehicle 3 and the key fob 23. If the key fob 23 is close to the vehicle 3, the time interval can be reduced to one (1) second. Conversely, if the key fob 23 is relatively far away from the vehicle 3, the time interval can be increased to five (5) seconds, for example.

The base station 5 and the key fob 23 can communicate with each other over a range of at least 20 meters and an authorization zone 39 having a radius of 2 meters is defined around the vehicle 3. When the electronic control unit 7 determines that the key fob 23 is inside the authorization zone 39 it automatically unlocks one or more of the vehicle's doors D1-D4. Conversely, when the electronic control unit 7 determines that the key fob 23 is outside the authorization zone 39, it automatically locks the vehicle's doors D1-D4.

Operating modes of the vehicle access system 1 will now be described by way of example. In the illustrated operating modes, the key fob 23 is carried on the person of the user and the movements of the user are illustrated by a set of footprints 41. The process for authenticating the key fob 23 is the same as described above and is common to each of the operating modes. In particular, the remote transceiver 25 transmits a polling signal which initiates an authentication cycle with the first transceiver 11. The base station 5 transmits a challenge signal which triggers transmission of a response signal from the key fob 23. The electronic control unit 7 validates the response signal and, if successful, the base station 5 tracks the range and position of the authenticated key fob 23. If the authentication cycle is not successfully completed, for example due to an incorrect response signal being sent from the key fob 23, the doors D1-D4 will not be unlocked and the vehicle 3 will not respond to the key fob 23.

Figure 3:
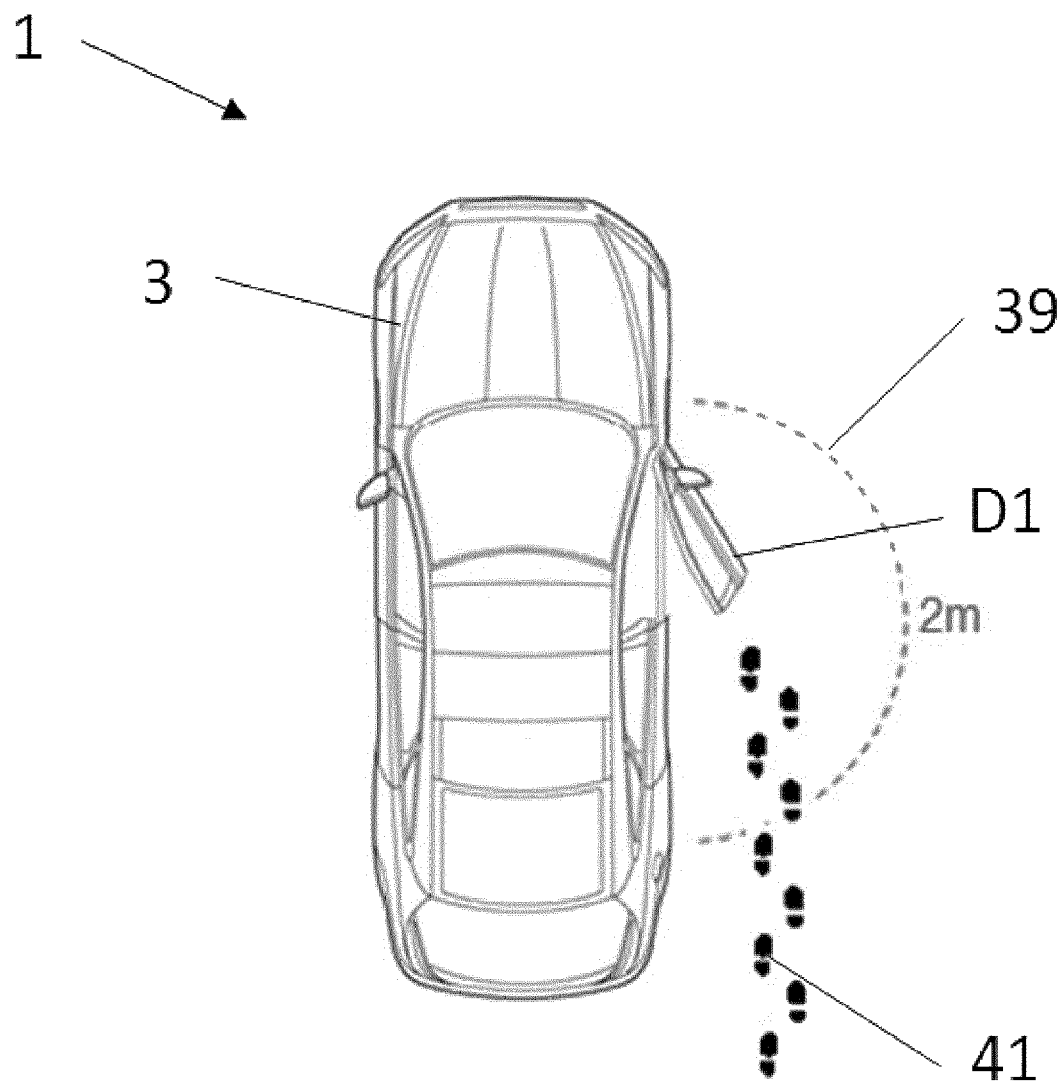
FIG. 3 a first operating mode of the vehicle access system.

A first operating mode is illustrated in FIG. 3 in which the vehicle access system 1 operates to unlock the doors D1-D4 on the side of the vehicle 3 on which the user approaches with the key fob 23. Having authenticated the key fob 23 the base station 5 tracks its range and position. In the illustrated example, the electronic control unit 7 determines that the key fob 23 is on the right hand side of the vehicle 3. Once the base station 5 determines that the key fob 23 is within the authorization zone 39, the electronic control unit 7 automatically generates a door unlock signal to unlock both doors D1, D2 on the right hand side of the vehicle 3. The door unlock signal is transmitted via the CAN bus 21 and the front right door D1 and the rear right door D2 are unlocked when the key fob 23 enters the authorization zone 39. As the door is unlocked before the user operates the respective door handle, in normal operating conditions it is envisaged that there would be no perceptible delay when the user operates the door handle.

When the user operates the door handle on either the front right door D1 or the rear right door D2, either a single-point entry (SPE) or a multiple-point entry (MPE) can be initiated. In a single-point entry, the electronic control unit 7 generates control signals to lock all of the doors D1-D4 when the key fob 23 is detected inside the vehicle 3 and all of the doors D1-D4 have been closed. In a multiple-point entry, the electronic control unit 7 generates control signals to unlock all of the other doors in the vehicle 3 when the door handle of either the front right door D1 or the rear right door D2 is operated. It will be appreciated that the front left door D3 and the rear left door D4 will be unlocked if base station 5 determines that the key fob 23 enters the authorization zone 39 on the left hand side of the vehicle 3.

Only when the door handle of one of the unlocked doors D1-D4 is operated is an indication provided that the doors have been unlocked, for example by flashing the side repeaters and/or extending the door mirrors. If none of the door handles are operated, no indication is provided that one or more of the doors D1-D4 have been unlocked.

Figure 4:
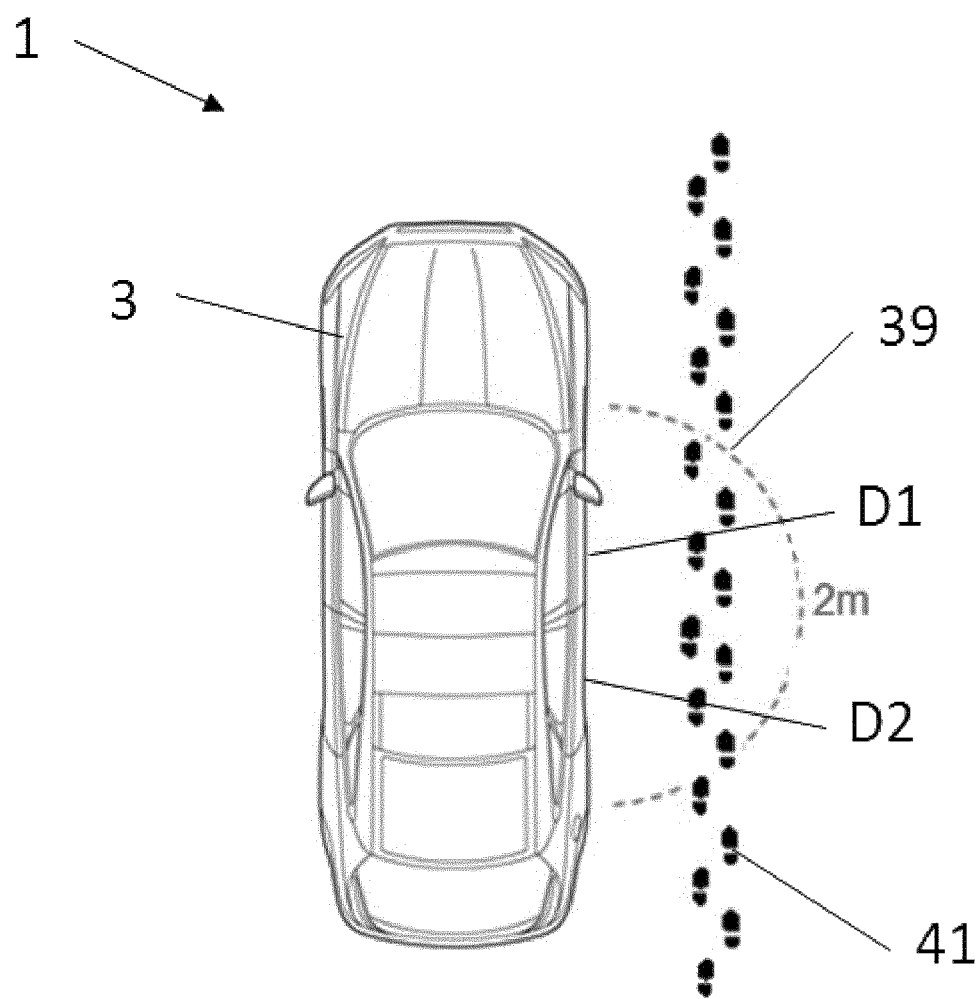
FIG. 4 illustrates a second operating mode of the vehicle access system.

A second operating mode is illustrated in FIG. 4 in which the vehicle access system 1 detects a walk-past scenario in which the user does not operate a door handle. As before, the base station 5 authenticates the key fob 23 as it approaches the vehicle. The base station 5 tracks the position of the key fob 23 and determines that the user is approaching from the rear of the vehicle 3 on the right hand side. When the vehicle access system 1 detects that the key fob 23 has entered the authorization zone 39, a door unlock signal is transmitted to unlock the front right door D1 and the rear right door D2.

This is the same operating procedure as described above for the first mode of operation, but in this case the user does not operate the door handle on either of the doors D1, D2. Instead, the user walks past the vehicle 3. The vehicle access system 1 determines when the key fob 23 leaves the authorization zone 39 and a door lock signal is transmitted to lock the front right door D1 and the rear right hand door D2. The vehicle 3 does not provide a visual indication when the doors D1, D2 are unlocked or subsequently locked.

Figure 5:
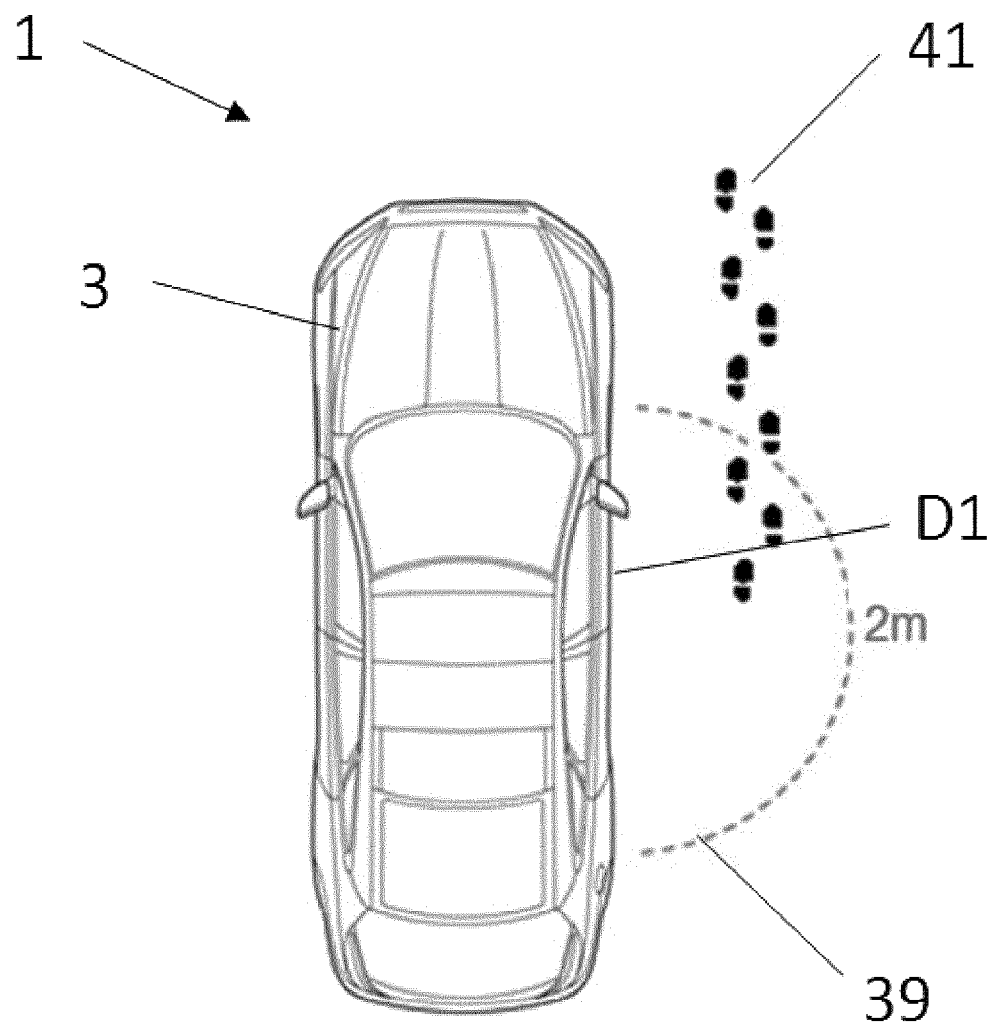
FIG. 5 illustrates a third operating mode of the vehicle access system.

A third operating mode is illustrated in FIG. 5 in which the vehicle access system 1 operates automatically to lock the doors D1-D4 when the user walks away from the vehicle 3. The user exits the vehicle 3 carrying the key fob 23 and closes the vehicle doors D1-D4. In the present example, the user exits the vehicle 3 through the front right door D1 and then closes it. The user then walks away from the vehicle 3 carrying the key fob 23 with them. The vehicle access system 1 determines when the key fob 23 has left the authorization zone 39 and transmits a door lock signal to lock the doors D1-D4. The vehicle 3 is thereby secured automatically without the user activating the key fob 23 or taking any action other than walking away from the vehicle 3. A security protocol to comply with industry standards, for example those specified by Thatcham®, would typically be undertaken for the automatic locking of the doors D1-D4.

Under normal operating conditions, the automatic locking of the vehicle 3 does not double-lock the vehicle. Rather, the vehicle 3 would only be double-locked if the user specifically selected this locking mode, for example via a control panel in the vehicle 3.

Figure 6:
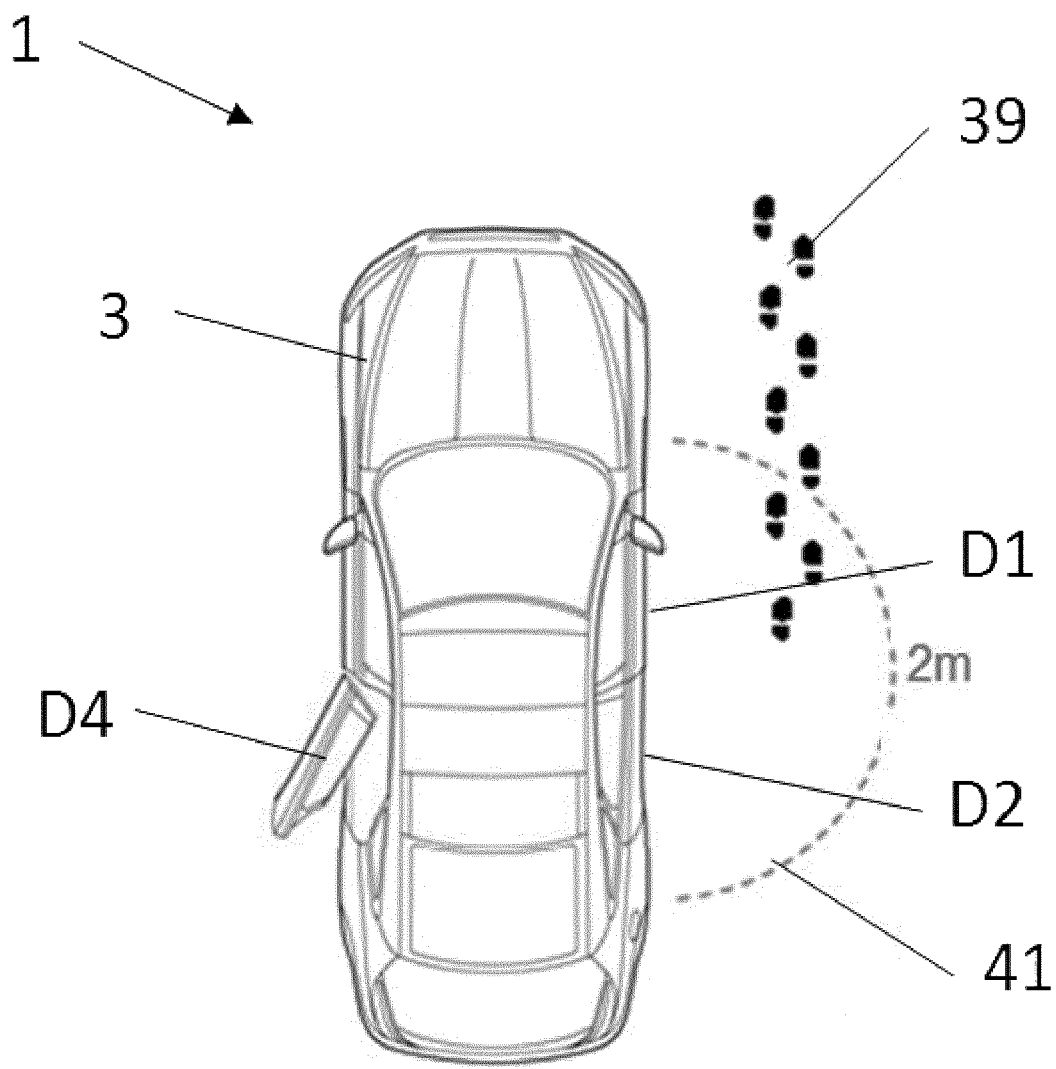
FIG. 6 illustrates a fourth operating mode of the vehicle access system.

A fourth operating mode is illustrated in FIG. 6 in which the vehicle access system 1 operates in a mis-lock scenario. This mode is similar to the third operating mode described above insofar as the user exits the vehicle 3 through the front right door D1 and closes the door D1 before walking away from the vehicle 3. The vehicle access system 1 again determines when the key fob 23 leaves the authorization zone 39. However, as illustrated in FIG. 6, the rear left door D4 is ajar and the electronic control unit 7 determines that the door cannot be locked (a so-called mis-lock).

To avoid the user leaving the vehicle 3 in an unsecure state (as may otherwise occur if they had not noticed that the rear left door D4 was ajar) the electronic control unit 7 transmits an alert signal to the CAN bus 21 and a notification is provided to the user. For example, the CAN bus 21 may illuminate the side repeaters and/or provide an audible warning to notify the user that the doors D1-D4 have not all been locked. When the rear left door D4 is closed, the vehicle access system 1 will lock the door D4 to secure the vehicle 3.

The vehicle access system 1 can optionally also provide keyless engine starting for the vehicle 3. By using the ranging data from the transceivers 11, 13, 15, the electronic control unit 7 can determine when the key fob 23 is inside the vehicle 3. A control signal can be transmitted to the engine control unit, via the CAN bus 21, to permit keyless engine starting when a Start button is pressed.

The vehicle access system 1 according to the present invention can be further refined. In particular, the electronic control unit 7 can be configured to transmit a status signal to the key fob 23. For example, if the base station 5 detects a mis-lock scenario, the status signal may instruct the key fob 23 to generate a first user alert. Equally, the status signal may instruct the key fob 23 to generate a second user alert (which is different from the first user alert) when the vehicle 3 has been locked. The first and/or the second user alert could be provided instead of, or in addition to, any notification provided by the vehicle 3. The key fob could comprise an audio, optical or haptic output for indicating the vehicle status. For example, the key fob 23 could comprise one or more of the following: LED(s), a text screen or a vibrating mechanism.

The key fob 23 is also provided with one or more buttons to allow a user to trigger locking/unlocking of the vehicle doors from outside of the authorization zone 39.

The ultra-wideband (UWB) transceivers 11, 13, 15, 25 described herein are compliant with IEEE802.15.4a protocol.

The vehicle access system 1 can monitor time of flight (ToF) communications between the base station 5 and the key fob 23 to provide improved security, for example to protect against a relay-station security attack.

A door unlock override switch can be provided to unlock the doors D1-D4 in the event of an emergency.

The skilled person will understand that various changes and modifications can be made to the vehicle access system 1 described herein without departing from the spirit and scope of the present invention. For example, a welcome lights function could be supported by illuminating an interior and/or exterior vehicle light when the key fob 23 enters the authorization zone 39.

Although the vehicle access system 1 has been described with reference to the key fob 23 transmitting the polling signal, the system could also operate if the base station 5 transmitted the polling signal.

The key fob 23 could be provided with a motion sensor, such as a gyroscope or an accelerometer, to detect movement. The key fob 23 could be disabled if the base station 5 determines that it has been stationary for a predetermined period of time. For example, the base station 5 could transmit a disable signal to deactivate the transceivers 11, 13, 15, 25. Alternatively, the transceivers 11, 13, 15, 25 could be disabled automatically if they do not receive an authorisation signal for a predetermined period of time. The key fob 23 could be awakened by an activation signal from the motion sensor when it detects movement.

In the embodiment of the vehicle access system 1 described above, the base station 5 comprises three transceivers 11, 13, 15. As mentioned previously, with such an arrangement, in which the transceivers 11, 13, 15 are disposed at spaced apart locations within the vehicle 3, it is possible to use the transmission and/or response times for communications sent between the key fob 23 and each of the transceivers 11, 13, 15 to determine the position of the key fob 23 relative to the vehicle 3. In more detail, with the base station 5 and the first transceiver 11 located toward the rear of the vehicle and the second and third transceivers 13, 15 disposed within the roof (on respective left and right sides), the position of the key fob 23 in a horizontal plane around the vehicle 3 can readily be determined, i.e. as shown in the plan view of FIGS. 2 to 6. However, with the second and third transceivers 13, 15 disposed in the vehicle roof, and therefore lying in the same horizontal plane, there may be situations in which it is not possible to readily determine the position of the key fob 23 in a vertical plane, i.e. in a direction normal to the plan views of FIGS. 2 to 6. Being able to accurately determine the position of the key fob 23 in a three-dimension space around the vehicle 3 may be particularly useful in certain situations, for example when the vehicle is parked in a multi-level or multi-storey car park. In such situations it is possible that the driver, having exited the vehicle 3 may move to another level of the car park above or below the vehicle 3, but still be close enough to the vehicle to be within the authorisation zone, resulting in one or more of the vehicle doors being unlocked. Accordingly, in a further embodiment of the invention, the vehicle access system 1 may comprise a fourth transceiver which is disposed within the vehicle at a location which is spaced apart in a vertical direction from both the plane of the vehicle roof and the horizontal plane in which the base station 5 lies. For example, the fourth transceiver could be mounted in the vehicle dashboard on the vehicle centre line. With this configuration, the height of the key fob 23 relative to the vehicle 3 can readily be determined. Accordingly, if it is determined that the key fob 23 is disposed sufficiently above or below the vehicle, such as in the example of the multi-level car park, the electronic control unit 7 may not unlock the vehicle doors even when the key fob 23 would otherwise be judged to be within the authorisation zone.

Moreover, it will be appreciated that it is not necessary for a vehicle access system according to the present invention to provide all of the operating modes described herein. Rather, one or more of the operating modes could be embodied in an access system in accordance with the present invention.

The invention claimed is:

1. An access unit configured to control access to a vehicle via communication with a further access unit, the access unit comprising:
   a first transmitter configured to transmit a polling signal; and
   a first receiver configured to receive an authentication signal from the further access unit in response to said polling signal;
   wherein the first transmitter is a first ultra-wideband transmitter and the first receiver is a first ultra-wideband receiver;
   wherein the first transmitter is configured to pulse the polling signal with a time interval between transmissions;
   wherein the first transmitter is configured to:
      increase the time interval between transmissions of the polling signal in response to an increase in a distance between the access unit and the further access unit; and
      reduce the time interval between transmissions of the polling signal in response to a reduction in the distance between the access unit and the further access unit,
   wherein the distance between the access unit and the further access unit is determined based on a time of flight of communications between the access unit and the further access unit, the first transmitter being configured to set the time interval in dependence on the determined distance;
   wherein the further access unit comprises a controller configured to authenticate a response signal transmitted from the access unit in response to said authentication signal; and
   wherein the controller is configured to initiate unlocking of at least one vehicle door when the distance between the access unit and the further access unit is less than or equal to a threshold range; and the controller is configured to initiate locking of at least one vehicle door when the distance between the access unit and the further access unit is greater than or equal to a threshold range.

2. The access unit of claim 1, wherein the first transmitter is configured operatively to transmit the polling signal continually during an operating period to initiate communication between the access unit and the further access unit.

3. The access unit of claim 1, wherein the access unit is a portable unit for communicating with a further access unit installed in a vehicle.

4. The access unit of claim 3, wherein the first transmitter stops transmitting the polling signal if the access unit is stationary for a predetermined period of time.

5. The access unit of claim 4, comprising a motion sensor for outputting an activation signal to start the first transmitter transmitting the polling signal when the access unit is moved.

6. A vehicle access system comprising the access unit of claim 1 in combination with a further access unit, wherein the further access unit comprises:
   a second receiver configured to receive the polling signal from the access unit; and
   a second transmitter configured to transmit an authentication signal;
   wherein the second transmitter is operatively configured to transmit the authentication signal in response to the polling signal received from the access unit; and
   wherein the second transmitter is a second ultra-wideband transmitter and the second receiver is a second ultra-wideband receiver.

7. The vehicle access system of claim 6, wherein the controller is configured to:
   determine a direction of the access unit in relation to the further access unit; and
   initiate the unlocking of at least one vehicle door on a side of the vehicle proximal the access unit.

8. The vehicle access system of claim 6, wherein the controller is configured to:
   generate an alert signal if a vehicle door is partially or completely open.

9. A method of operating a vehicle access system, the method comprising:
   transmitting a polling signal from an access unit;
   transmitting an authentication signal from a further access unit upon receipt of said polling signal;
   wherein the polling signal and the authentication signal are ultra-wideband signals;
   wherein the polling signal is pulsed and a time interval is introduced between pulses, and the time interval is increased in response to an increase in a distance between the access unit and the further access unit, and reduced in response to a reduction in the distance between the access unit and the further access unit;
   determining the distance between the access unit and the further access unit based on a time of flight of communications between the access unit and the further access unit; and
   setting the time interval in dependence on the determined distance,
   wherein the polling signal is transmitted continually during an operating period and contact between the access unit and the further access unit is initiated upon receipt of the polling signal by said further access unit, and
   wherein at least one vehicle door is unlocked when the distance between the access unit and the further access unit is less than or equal to a threshold range, and wherein at least one vehicle door is locked when the distance between the access unit and the further access unit is greater than or equal to the threshold range.

10. A vehicle having the access unit of claim 1.

11. A vehicle having the vehicle access system of claim 6.

* * * * *